Figure 1:
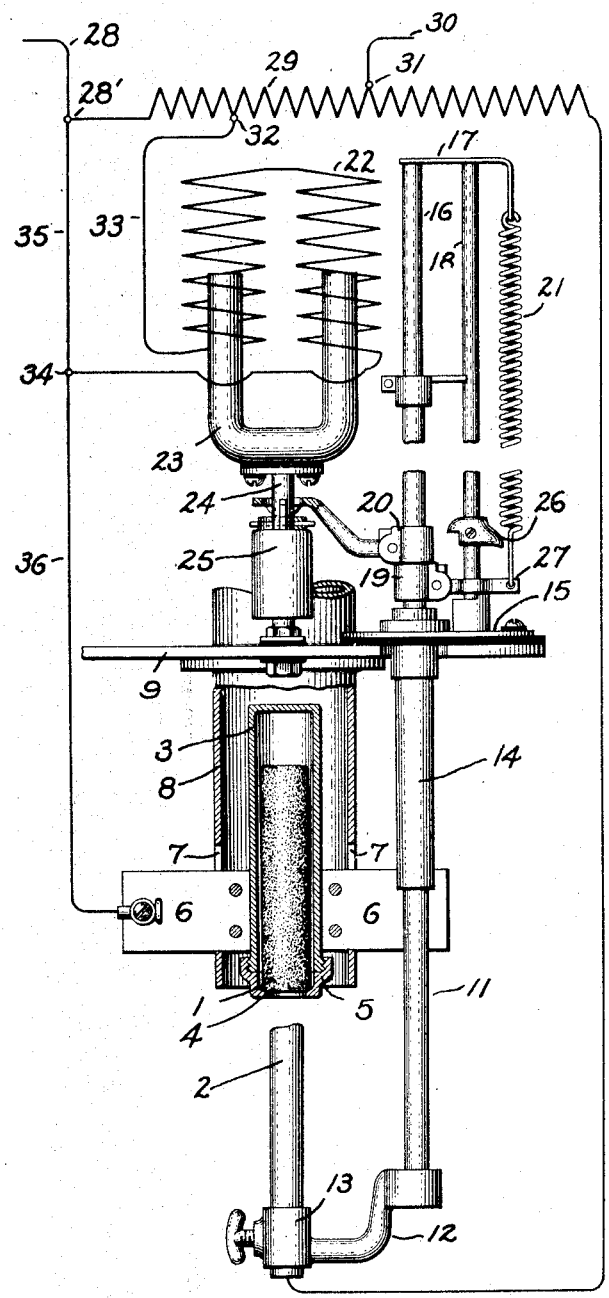

C. P. STEINMETZ.
ARC LAMP.
APPLICATION FILED JAN. 13, 1913.

1,200,258.

Patented Oct. 3, 1916.

Witnesses:
Earl G. Klock.
J. Ellis Glu

Inventor:
Charles P. Steinmetz,
by His Attorney.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ARC-LAMP.

1,200,258.   Specification of Letters Patent.   Patented Oct. 3, 1916.

Application filed January 13, 1913. Serial No. 741,655.

*To all whom it may concern:*

Be it known that I, CHARLES P. STEINMETZ, a citizen of the United States, residing at Schenectady, county of Schenectady, State of New York, have invented certain new and useful Improvements in Arc-Lamps, of which the following is a specification.

My invention relates to a method and apparatus for operating arc lamps on alternating current systems, and particularly lamps in which are used electrodes giving a flaming or luminous arc. Such an arc has hitherto been produced by using a lower negative electrode made of a material, such as titanium carbid, which produces a flaming or luminous arc, and, when used with direct current, an upper positive carbon electrode. In a lamp of this type, a non-conducting slag is liable to form at the tip of the lower electrode, which, when cold, sometimes prevents a proper establishment of the arc unless special provision is made for overcoming this defect. This difficulty is increased in a lamp of this type because of the fact that the arc gives off fumes which form a dense insulating deposit, which, if allowed to collect upon the upper electrode, further interferes with the establishment of the arc. In lamps of this class, it has hitherto been common to control the arc through suitable connections between the electrodes and a series and a shunt magnet. The mechanism in such a lamp is necessarily somewhat complicated. I have simplified the structure by controlling the operation of the lamp through a single magnet, which, together with the electrodes, is so connected to a local inductive device, that in the establishment of the arc the electrodes are brought together with sufficient impact to break through any ordinary insulating slag or deposit that may have formed upon the electrodes, and at the same time the reactions within the transformer create a large difference of potential between the electrodes which tends to break down any slag that may have formed upon the arcing ends of the electrodes. As soon as the electrodes are brought into engagement and the arc is started, the energy required to support the same causes a corresponding loss in the magnet, with the consequence that the same is no longer operatively energized, and the electrodes are permitted to separate and fully establish the arc. The aim realized by this method of operation is that two local sources of low and high potential electric energy, respectively, are established inductively by the line current; that the low potential energy, acting upon the single magnet, causes the same to bring the two electrodes in contact, and that by that contact the local high potential source can now discharge its energy through the electrode circuit, thereby diminishing the low potential energy by which the magnet was energized, so that now the electrodes become separated and the arc is maintained by the high potential energy.

For a fuller understanding of my invention reference is had to the accompanying drawings, in which—

Figure 2:
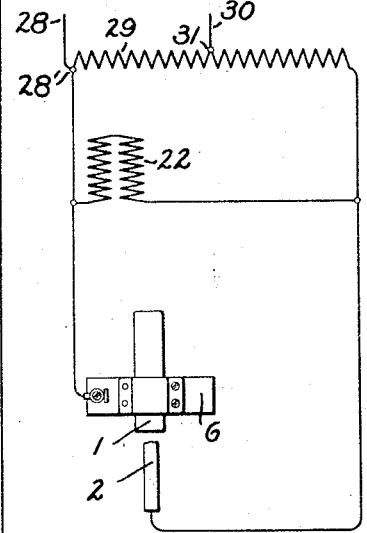

Figure 1 is a side view of so much of my lamp as is necessary to an understanding of my invention, with portions shown in section and the circuits indicated diagrammatically. Fig. 2 is a diagrammatic view of a modified arrangement of circuits.

In the drawings, 1 and 2 represent the upper and lower electrodes respectively. I have shown the upper electrode in the form of a carbon rod which is received within a sheath 3 which may be made of copper and closed at the top. The lower end of the sheath is provided with an abutment 4 upon which the upper electrode rests. This abutment may conveniently be made removable by forming it upon a member 5 which screws on the lower end of the sheath 3. It is obvious that as the upper electrode burns away, it will drop against the abutment and its arcing face always remain in the same position relative to the sheath. I have shown a space between the electrode and the sheath, and it will be seen that there can be no appreciable interchange between the gas within the sheath and the gases surrounding the arc, and that this layer of gas surrounding the electrode prevents oxidation thereof. Furthermore, the sheath 3, being of substantial proportions, is kept at a rather low temperature, while the tip of the carbon itself is run at a high temperature in order to prevent deposition of products of combustion thereon. Sheath 3 is provided with wings 6 which are received in slots 7 in the chimney 8, which is suitably secured to a platform 9 and registers with an opening therein. The chimney 8 is continued above the platform 9, but in the drawing is shown broken away. The platform 9 may be suitably supported in the lamp. The lower electrode 2 is carried by a rod 11, to the lower end of which is secured an arm 12 provided at its end with a socket 13 which receives the lower electrode. The rod 11 passes through and is guided by a sheath 14 which passes through platform 9 and is supported by an auxiliary platform 15. The upper end of the rod 11, which is hollow, embraces a stationary rod 16 and is further guided thereby. The rod 16 is supported by a plate 17 secured to an upright 18 rising from platform 15. The lower electrode carrying rod 11 is embraced by the holding clutch 19 and lifting clutch 20. A spring 21 connects the outer end of the clutch 19 to the outer end of the plate 17.

The lifting clutch 20 is operated through the solenoid 22, to the core 23 of which is secured a stem 24 which is embraced by the outer end of the clutch 20. A dash-pot 25 is suitably connected to the stem 24 so as to retard the downward movement of the lower electrode as well understood in the art. The holding clutch 19 operates between two stops 26 and 27 which limit its upward and downward movements. When the solenoid 22 is operatively energized, the rod 11 is lifted by the clutch 20. The clutch 19 is simultaneously raised by the spring 21 until it engages stop 26. The lifting clutch 20, however, continues its upward movement until the lower electrode engages the upper. When the solenoid 22 is no longer operatively energized the rod 11 drops back until the holding clutch 19 engages stop 27 and arrests the movement of the rod 11, the distance which the lower electrode falls away from the upper being thus limited to the distance which the clutch 19 drops between the stops 26 and 27.

In Fig. 1, the leading-in wire 28 is connected to the terminal 28' of an auto-transformer 29, the other terminal of which is connected to the lower electrode. The leading-in wire 30 is connected to an intermediate point 31 of the transformer, and, at a point 32 intermediate between the points 28' and 31, the transformer is connected by a wire 33 to one terminal of the magnet coil 22, the other terminal of which is connected at a point 34 with the terminal 28' by a wire 35 and also by a wire 36 with one of the wings 6 of the shell 3 which houses the upper electrode. When the lamp is not in operation, the electrodes are separated, as shown in Fig. 1.

It will be seen from the foregoing that the portion of the auto-transformer between the points 28' and 31 constitutes the primary, while the whole winding of the transformer constitutes a high potential secondary, and the portion of the transformer between the points 28' and 32 constitutes a subsidiary low potential secondary. If now the series circuit is connected to the terminals 28 and 31, the main secondary circuit is open at the electrodes and the subsidiary low potential secondary is completed. Consequently, the magnet coil 22 will receive a low potential but large current, and, if the magnet winding 22 is properly proportioned, the current passing through the same may be three to four times greater than the normal current received by the lamp. The core 23 will therefore, be pulled up with considerable power and bring the electrodes together with a blow, which tends to break through any slag that may have formed at their ends, and at the same time this blow will shake from the upper electrode and its inclosing sheath deposits that may have accumulated thereon. As soon as the main secondary circuit is closed between the electrodes, the current in the subsidiary secondary is largely diminished. This is true as the primary ampere turns equal the secondary ampere turns, and when the arc is open the subsidiary secondary of the transformer supplies all of the ampere turns, whereas, after the arc is started, the subsidiary secondary furnishes only a fraction of the total secondary ampere turns. The energy in the magnet is thus reduced, the magnet no longer operatively energized and the current in the subsidiary secondary, and consequently the energy therein, is largely diminished and the core of the magnet is thereby allowed to drop and with it the clutch 20; the electrodes are thus separated. At the moment when the two electrodes come together, the high open-circuit voltage between the extreme terminals of the transformer discharges momentarily through the electrodes, breaking through any insulation that may have formed at the arcing faces. When then, the electrodes are separated, the main secondary establishes and maintains the arc. I have found that from 400 to 500 volts may sometimes be necessary for the purpose of insuring the initial passage of current between the electrodes, and my transformer is designed to produce such voltage.

In Fig. 2, I have shown a modification of the connections between the transformer and the operating magnet. In this form of my invention, the magnet 22 is arranged in shunt relation to the arc. It will readily be understood that when the current is turned on the series circuit the magnet 22 is operatively energized, the lower electrode is lifted against the upper electrode, at which time a high voltage is available between the electrodes and the magnet 22 is short-circuited and permits the lower electrode to drop back a predetermined distance and strike the arc.

It will be seen that the lamp herein described is simple in construction and operation and is one in which the electrodes are brought together with considerable force preparatory to establishing the arc, at which time a high voltage is available to break through any insulation at the electrode faces. Such a lamp may conveniently be used on existing alternating series circuit lines in which the operating current is commonly 6.6 or 7.5 amperes, and in which a current of but 2½ to 4½ amperes is desired in the arc.

While I have shown and described what I at present consider the best form of my invention, it is to be understood that numerous changes could be made without departing from the spirit thereof. For instance, I have shown my lamp operated from an auto transformer, but it is obvious that an ordinary transformer could also be used. When I refer, therefore, in the claims to a transformer, it is to be understood that I intend to cover either an ordinary transformer or an auto-transformer. It is also obvious that while my lamp is particularly designed for use in connection with flaming electrodes, it can be used with any electrodes whatever.

A lamp embodying my invention requires a higher voltage for starting than in running, and, if the circuit, therefore, is to be fully loaded with such lamps, some automatic device is required for cutting in the lamps. Such a device is shown in a patent issued to Alexander Dempster, No. 1,006,729, October 24, 1911, which shows a series of dash-pots for the circuit, one for each lamp, and requiring successively greater time intervals for their operation. The dash-pots are operated by solenoids, and they control the lamp circuits which are thus successively cut in. I have not, therefore, here shown a complete lamp circuit. Furthermore, the difference between starting and operating voltage could be considerably reduced by giving to the operating magnet a differential winding connected in series with the arc.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means within the scope of the claims.

What I claim as new and desire to secure by Letters Patent of the United States, is:—

1. The method of starting and maintaining an electric arc which consists in inductively establishing by a constant current main line, two inductively linked local sources of electric energy, one of low and the other of high potential, connecting the terminals of the high potential source to the electrodes, causing the low potential energy to momentarily contact the electrodes between which the arc is to be established, and thereby directing the high potential local energy to the electrodes, and separating the electrodes on diminution of current in the low potential source and maintaining the arc by the high potential source.

2. In an arc lamp, a source of alternating current, a transformer having a primary connected with said source and provided with high and low potential secondaries, a pair of electrodes one of which is arranged to be moved away from the other by gravity, an operating magnet for the electrodes connected to the low potential secondary, the electrodes being connected to the high potential secondary.

3. In an arc lamp, a source of alternating current, a transformer having a low and a high potential secondary and the primary connected in series with said source, a pair of normally separated electrodes, a magnet for bringing said electrodes together connected to the low potential secondary, and connections between said electrodes and the terminals of the high potential secondary, whereby when said electrodes are brought together a high voltage discharge is momentarily passed between the same.

4. In an arc lamp, a source of alternating current a transformer having its primary connected in series with said source, coöperating electrodes on the arcing face of which a non-conducting layer may form connected to a high potential secondary winding, and a regulating magnet for said electrodes connected to a section of said primary winding.

5. In an arc lamp, a source of alternating current, a transformer having its primary arranged in series with said circuit, a pair of coöperating electrodes, and an operating magnet, said electrodes and said magnet being included in circuits including a greater number and a lesser number of turns respectively of said transformer than the primary.

6. In an arc lamp, a source of alternating current a step-up transformer having its primary arranged in series with said source, a pair of normally separated coöperating electrodes connected to the secondary of said transformer, an operating magnet for said electrodes, said magnet being connected to a section of the primary of said transformer.

In witness whereof, I have hereunto set my hand this 10th day of January 1913.

CHARLES P. STEINMETZ.

Witnesses:
   BENJAMIN B. HULL,
   HELEN ORFORD.